(12) United States Patent
  Gardella

(10) Patent No.: US 11,411,755 B2
(45) Date of Patent: Aug. 9, 2022

(54) NOTIFYING OFF-LINE CHARGING SYSTEMS OF USER EQUIPMENT EVENTS IN PRESENCE REPORTING AREAS

(71) Applicant: Nokia Technologies Oy, Espoo (FI)

(72) Inventor: Maryse Gardella, Velizy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/273,668

(22) PCT Filed: Aug. 30, 2018

(86) PCT No.: PCT/EP2018/073368
§ 371 (c)(1),
(2) Date: Mar. 4, 2021

(87) PCT Pub. No.: WO2020/043295
PCT Pub. Date: Mar. 5, 2020

(65) Prior Publication Data
US 2022/0021549 A1 Jan. 20, 2022

(51) Int. Cl.
*H04M 15/00* (2006.01)
*H04L 12/14* (2006.01)
(52) U.S. Cl.
CPC ........ *H04L 12/1407* (2013.01); *H04M 15/64* (2013.01); *H04M 15/65* (2013.01); *H04M 15/66* (2013.01); *H04M 15/8033* (2013.01); *H04M 15/8214* (2013.01)
(58) Field of Classification Search
CPC ... H04L 12/1407; H04M 15/64; H04M 15/65; H04M 15/66; H04M 15/8033; H04M 15/8214
See application file for complete search history.

(56) References Cited

U.S. PATENT DOCUMENTS 10,148,779 B2 * 12/2018 Yang .................. H04L 12/1407
10,455,382 B2 * 10/2019 Pancorbo Marcos ......................
                                                        H04M 15/8033
10,499,240 B2 * 12/2019 Shi .................... H04M 15/8033
10,701,743 B2 *  6/2020 Shan .................... H04M 15/66
(Continued)

FOREIGN PATENT DOCUMENTS

WO     2017080997 A1    5/2017
WO     2017107563 A1    6/2017

OTHER PUBLICATIONS

International Search Report and Written Opinion dated May 13, 2019 for International Application No. PCT/EP2018/073368, 15 pages.
(Continued)

*Primary Examiner* — Pakee Fang
(74) *Attorney, Agent, or Firm* — Tong, Rea, Bentley & Kim, LLC

(57) ABSTRACT

A policy control and resource function (PCRF) is subscribed (at a network entity) to receive notifications of events for a first set of presence reporting areas (PRAs) associated with a packet data network (PDN) connection involving a user equipment. An online charging system (OCS) is subscribed (at the network entity) to receive notifications of events for a second set of PRAs associated with the PDN connection involving the user equipment. The network entity notifies an off-line charging system (OFCS) in response to a first event occurring at one or more first PRAs that are in the first set of PRAs.

15 Claims, 4 Drawing Sheets

(56) References Cited

U.S. PATENT DOCUMENTS

2017/0163431 A1 6/2017 Castro et al.
2017/0373863 A1 12/2017 Mouafik et al.

OTHER PUBLICATIONS

Secretary of SA WG2, "Report of SA WG2 meetings #126," Version 1.0.0.—Approved at SA WG2#127; Feb. 26-Mar. 2, 2018; Montreal, Canada; XP051437409, Retrieved from the Internet: URL: http://www.3gpp.org/ftp/tsg% 5Fsa/WG2%5 FArch/Approved% 5FReports/; 60 pages.

Huawei et al., "Addition of charging support for Multiple PRAs," 3GPP TSG-SA5 Meeting #110; S5-166300; Reno, Nevada, US; Nov. 14-16, 2016; XP051187137, Retrieved from the Internet: URL:http://www.3gpp.org/ftp/Meetings_3GPP_ SYNC/SA/Docs/; 37 pages.

3GPP, "3GPP TS 23.501 V15.2.0", 3rd Generation Partnership Project; Technical Specification Group Services and System Aspects; System Architecture for the 5G System; Stage 2 (Release 15); Jun. 2018; 217 pages.

3GPP, "3GPP TS 23.203 V15.3.0",3rd Generation Partnership Project; Technical Specification Group Services and System Aspects; Policy and charging control architecture (Release 15); Jun. 2018; 262 pages.

3GPP, "3GPP TS 32.255 V0.3.0", 3rd Generation Partnership Project; Technical Specification Group Services and System Aspects; Telecommunication management; Charging management; 5G Data connectivity domain charging stage 2 (Release 15); May 2018; 42 pages.

3GPP, "3GPP TS 32.251 V15.3.0", 3rd Generation Partnership Project; Technical Specification Group Services and System Aspects; Telecommunication management; Charging management; Packet Switched (PS) domain charging (Release 15); Jun. 2018; 187 pages.

3GPP, "3GPP TS 23.401 V15.4.0", 3rd Generation Partnership Project; Technical Specification Group Services and System Aspects; General Packet Radio Service (GPRS) enhancements for Evolved Universal Terrestrial Radio Access Network (E-UTRAN) access (Release 15); Jun. 2018; 410 pages.

3GPP, "3GPP TS 29.212 V15.3.0", 3rd Generation Partnership Project; Technical Specification Group Core Network and Terminals; Policy and Charging Control (PCC); Reference points (Release 15); Jun. 2018; 282 pages.

3GPP, "3GPP TS 23.503 V15.2.0", 3rd Generation Partnership Project; Technical Specification Group Services and System Aspects; Policy and Charging Control Framework for the 5G System; Stage 2 (Release 15), Jun. 2018; 67 pages.

3GPP, "3GPP TS 32.298 V15.3.0", 3rd Generation Partnership Project; Technical Specification Group Services and System Aspects; Telecommunication management; Charging management; Charging Data Record (CDR) parameter description (Release 15); Jun. 2018; 214 pages.

ETSI, "ETSI TS 132 299 V14.3.0," Digital cellular telecommunications system (Phase 2+) (GSM); Universal Mobile Telecommunications System (UMTS); LTE; Telecommunication management; Charging management; Diameter charging applications; (3GPP TS 32.299 version 14.3.0 Release 14); Apr. 2017; 202 pages.

"Diameter Dictionaries and Attribute Definitions", AAA Interface Administration and Reference, StarOS Release 21.5; «http://www.cisco.com/c/en/us/td/docs/wireless/asr_5000/21-1/AAA/21-1-AAA-Reference/21-AAA-Reference_chapter_01101.pdf»; 350 pages.

India Office Action mailed in corresponding IN Patent No. 202147013020 dated Feb. 3, 2022, 6 pages.

* cited by examiner

NOTIFYING OFF-LINE CHARGING SYSTEMS OF USER EQUIPMENT EVENTS IN PRESENCE REPORTING AREAS

CROSS-REFERENCE TO RELATED APPLICATIONS

The present application is a U.S. National Stage under 35 U.S.C. § 371 of International Patent Application Serial No. PCT/EP2018/073368, entitled "NOTIFYING OFF-LINE CHARGING SYSTEMS OF USER EQUIPMENT EVENTS IN PRESENCE REPORTING AREAS" and filed on Aug. 30, 2018, the entirety of which is incorporated by reference herein.

BACKGROUND

Wireless communication systems include a network of base stations (also referred to as eNodeBs, gNB, access points, and the like) that provide wireless connectivity to user equipment within corresponding geographical regions or cells. The physical location of an active user equipment is known at a cell-level granularity. The cells are grouped into tracking areas (or location areas or routing areas) and the physical location of an idle user equipment is known at a tracking area granularity so that idle user equipment can be paged using the base stations that serve cells within a tracking area that includes the idle user equipment. Standards set by the Third Generation Partnership Project (3GPP) define presence reporting areas (PRAs) within the 3GPP packet domain for the purposes of reporting presence of user equipment within a PRA due to policy control or charging reasons. A PRA includes one or more cells, tracking areas, routing areas, eNodeBs, or NG-RAN node identifiers. The cells, tracking areas, routing areas, eNodeBs, or NG-RAN node identifiers may or may not be adjacent, contiguous, neighboring, or overlapping. Instead of a geographical view, the PRA represents a logical view of user equipment locations that is used in addition to the physical topology defined by cells, tracking areas, routing areas, eNodeBs, node identifiers, and the like. For example, a PRA for a shopping mall includes all the base stations that provide connectivity within a geographic area encompassed by the shopping mall. For another example, a PRA for a retail chain can include base stations that provide connectivity within geographic areas encompassed by outlets of the retail chain, even though the outlets are in geographically distinct locations that may be separated by large distances.

SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments of the method include subscribing, at a network entity, a policy control and resource function (PCRF) to receive notifications of events for a first set of presence reporting areas (PRAs) associated with a packet data network (PDN) connection involving a user equipment. The method also includes subscribing, at the network entity, an online charging system (OCS) to receive notifications for a second set of PRAs associated with the PDN connection involving the user equipment. The method further includes notifying, from the network entity, an off-line charging system (OFCS) of a first event in response to the first event occurring at a first PRA that is in the first set of PRAs.

In some embodiments, the network entity includes at least one of a PDN gateway (PGW) and a service management function (SMF).

In some embodiments, the first event is at least one of the user equipment entering the first PRA and the user equipment leaving the first PRA.

In some embodiments, the first event is at least one of a user equipment dedicated PRA and a core network PRA.

In some embodiments, the first PRA is not in the second set of PRAs and notifying the OFCS in response to the first event include notifying the OCS in parallel with notifying the PCRF.

Some embodiments further include receiving, at the network entity, information indicating initial statuses for the PRAs in the first set, notifying, from the network entity, the PCRF of the initial statuses, and notifying, from the network entity, the OFCS of the initial statuses with an indication that the PRAs in the first set are PCRF-related.

Some embodiments further include receiving, at the network entity, information indicating initial statuses for the PRAs in the second set, notifying, from the network entity, the OCS of the initial statuses, and notifying, from the network entity, the OFCS of the initial statuses with an indication that the PRAs in the second set are OCS-related.

Some embodiments of the method further include notifying, from the network entity, the PCRF and the OCS in response to a second event occurring at a second PRA that is in the first set of PRAs and the second set of PRAs.

In some embodiments, notifying the OFCS include notifying the OFCS in parallel with notifying the PCRF and the OCS.

In some embodiments, the OFCS generates a charging data record based on the notification of the first event.

Some embodiments of an apparatus include a receiver configured to receive a request to subscribe a policy control and resource function (PCRF) to receive notifications of events for a first set of presence reporting areas (PRAs) associated with a packet data network (PDN) connection involving a user equipment. The receiver is configured to receive a request to subscribe an online charging system (OCS) to receive notifications for a second set of PRAs associated with the PDN connection involving the user equipment. The apparatus also includes a transmitter configured to transmit a notification of a first event to an off-line charging system (OFCS) in response to the first event occurring at a first PRA that is in the first set of PRAs.

Some embodiments of the apparatus are implemented in at least one of a PDN gateway (PGW) and a service management function (SMF).

In some embodiments, the first event is at least one of a user equipment entering the first PRA and a user equipment leaving the first PRA.

In some embodiments, the first event is at least one of a user equipment dedicated PRA and a core network PRA.

In some embodiments, the first PRA is not in the second set of PRAs and notifying the OFCS in response to the first event include notifying the OCS in parallel with notifying the PCRF.

In some embodiments, the receiver is configured to receive information indicating initial statuses for the PRAs in the first set and the transmitter is configured to notify the PCRF of the initial statuses. The transmitter is also configured to notify the OFCS of the initial statuses with an indication that the PRAs in the first set are PCRF-related.

In some embodiments, the receiver is configured to receive indicating initial statuses for the PRAs in the second set and the transmitter is configured to notify the OCS of the initial statuses. The transmitter is also configured to notify the OFCS of the initial statuses with an indication that the PRAs in the second set are OCS-related.

In some embodiments, the transmitter is configured to notify the PCRF and the OCS in response to a second event occurring at a second PRA that is in the first set of PRAs and the second set of PRAs.

In some embodiments, the transmitter is configured to notify the OFCS in parallel with notifying the PCRF and the OCS.

In some embodiments, the OFCS generates a charging data record based on the notification of the first event.

Some embodiments of an apparatus include at least one processor and at least one memory including computer program code. The at least one memory and the computer program code are configured to, with the at least one processor, cause the apparatus at least to perform subscribing a policy control and resource function (PCRF) to receive notifications of events for a first set of presence reporting areas (PRAs) associated with a packet data network (PDN) connection involving a user equipment. The at least one memory and the computer program code are also configured to, with the at least one processor, cause the apparatus at least to perform subscribing an online charging system (OCS) to receive notifications for a second set of PRAs associated with the PDN connection involving the user equipment and notifying an off-line charging system (OFCS) in response to a first event occurring at a first PRA that is in the first set of PRAs.

In some embodiments, the at least one memory and the computer program code are configured to, with the at least one processor, cause the apparatus to receive information indicating initial statuses for the PRAs in the first set, notify the PCRF of the initial statuses, and notify the OFCS of the initial statuses with an indication that the PRAs in the first set are PCRF-related.

In some embodiments, the at least one memory and the computer program code are configured to, with the at least one processor, cause the apparatus to receive information indicating initial statuses for the PRAs in the second set, notify the OCS of the initial statuses, and notify the OFCS of the initial statuses with an indication that the PRAs in the second set are OCS-related.

In some embodiments, the at least one memory and the computer program code are configured to, with the at least one processor, cause the apparatus to notify the OCS in parallel with notifying the PCRF in response to the first PRA not being in the second set of PRAs.

In some embodiments, the at least one memory and the computer program code are configured to, with the at least one processor, cause the apparatus to notify the PCRF and the OCS in response to a second event occurring at a second PRA that is in the first set of PRAs and the second set of PRAs.

In some embodiments, the at least one memory and the computer program code are configured to, with the at least one processor, cause the apparatus to notify the OFCS in parallel with notifying the PCRF and the OCS.

Some embodiments of an apparatus include means for subscribing, at a network entity, a policy control and resource function (PCRF) to receive notifications of events for a first set of presence reporting areas (PRAs) associated with a packet data network (PDN) connection involving a user equipment. The apparatus also include means for subscribing an online charging system (OCS) to receive notifications for a second set of PRAs associated with the PDN connection involving the user equipment. The apparatus further include means for notifying an off-line charging system (OFCS) of a first event in response to the first event occurring at a first PRA that is in the first set of PRAs.

In some embodiments, the means for subscribing the OCS to receive notifications includes at least one of a packet data network (PDN) gateway (PGW) and a service management function (SMF).

In some embodiments, the first event is at least one of a user equipment entering the first PRA and a user equipment leaving the first PRA.

In some embodiments, the first event is at least one of a user equipment dedicated PRA and a core network PRA.

In some embodiments, the first PRA is not in the second set of PRAs and the apparatus include means for notifying the OCS in parallel with notifying the PCRF.

Some embodiments of the apparatus further include means for notifying, from the network entity, the PCRF and the OCS in response to a second event occurring at a second PRA that is in the first set of PRAs and the second set of PRAs.

Some embodiments of the apparatus include means for notifying the OFCS in parallel with notifying the PCRF and the OCS.

Some embodiments of the apparatus include means for generating a charging data record based on the notification of the first event.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
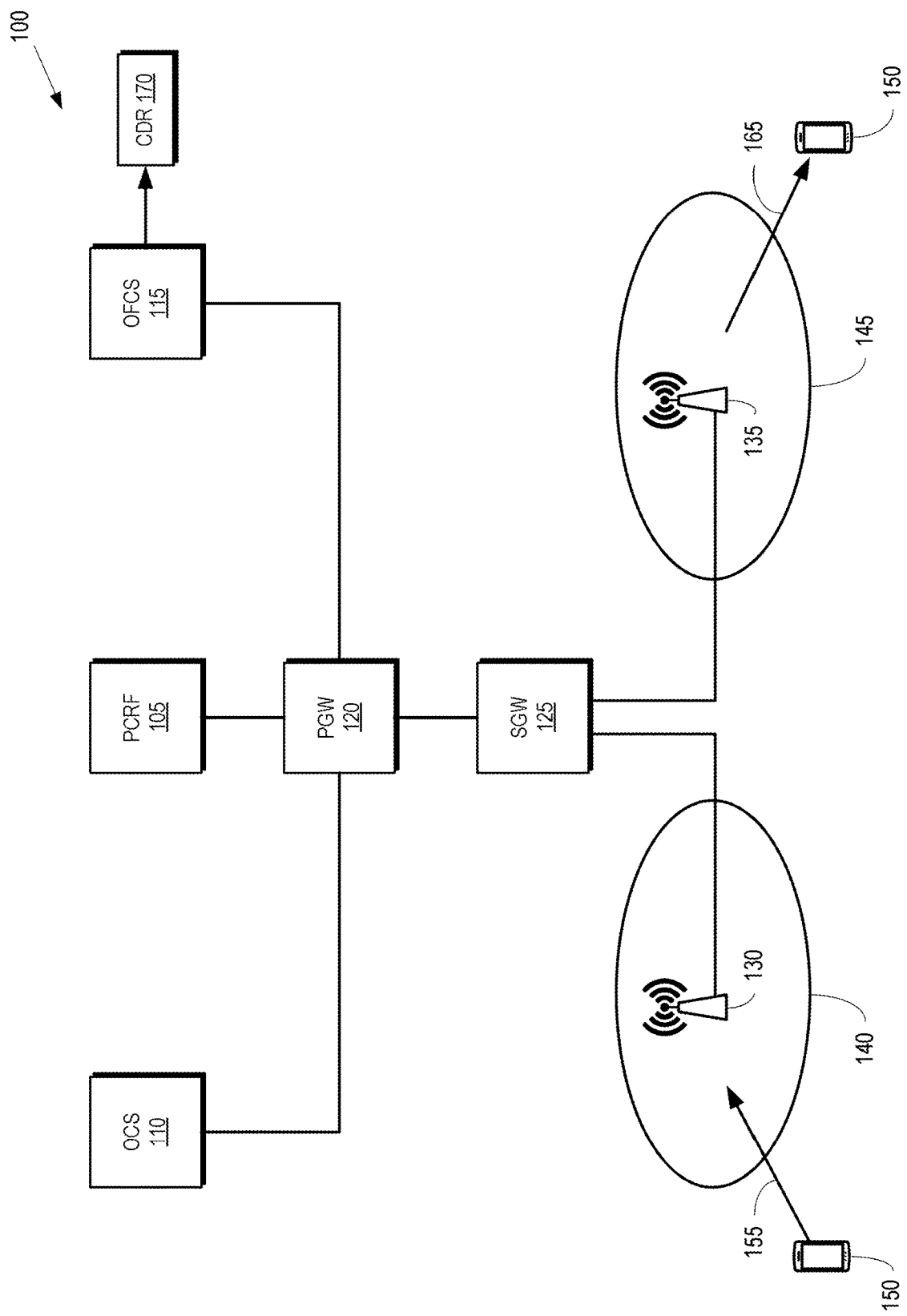
FIG. 1 is a block diagram of a communication system that generates notifications in response to events in presence reporting areas (PRAs) according to some embodiments.

Third Generation Partnership Project (3GPP) standards define two types of PRAs: (1) user equipment dedicated PRAs and (2) preconfigured core network PRAs, e.g., as disclosed in 3GPP Technical Specification (TS) 23.501, "UE presence in Area of Interest reporting usage by SMF," which is incorporated herein by reference in its entirety. The dedicated user equipment PRAs are identified based on characteristics defined in a subscriber profile. A UE dedicated PRA is typically composed of a short list of tracking areas, NG-RAN nodes, or cell identifiers in a public land mobile network (PLMN). For example, a PRA identifier can be assigned to one or more base stations in a home of an owner of a user equipment. Since the UE dedicated PRAs are defined per UE, the same PRA identifier can be used for different user equipment to identify different UE-dedicated PRAs, e.g., the same PRA identifier may be used for different user equipment to identify different UE-dedicated PRAs. Furthermore, the PRA identifier for a user equipment can be defined differently for the PCRF and the OCS. The preconfigured core network PRAs are assigned by a PLMN and predefined in a mobility management entity (MME) or an AMF (in 5G). A preconfigured core network PRA is typically composed of a short list of tracking areas, NG-RAN nodes, or cell identifiers in the PLMN. For example, an MME can assign a PRA identifier to the base stations that provide connectivity within a shopping mall. Packet data network (PDN) gateways (PGWs) detect events associated with user equipment in the PRAs. Examples of events include user equipment entering a PRA, user equipment leaving a PRA, or an inactive PRA. The subscription (PCRF and OCS) is on a per PDN connection basis, i.e., each subscription is for a corresponding PDN connection.

A policy and charging rules function (PCRF) or an online charging system (OCS) in a wireless communication system subscribe to receive notification of user equipment events received by a network entity such as a PGW or a service management function (SMF). Previous 3GPP standards allowed the PCRF to subscribe to notification of events for a single PRA for each user equipment, by selecting the PRA identifier (either UE-dedicated or core network) towards the network entity. The network entity indicates to the OCS the PRA identifier selected by the PCRF. An OCS could also subscribe to receive notifications of events for the user equipment, but the OCS could only subscribe to the PRA indicated by the PRA identifier, which was previously selected by the PCRF during subscription to the network entity. i.e., only the PCRF could indicate the scope of the subscription. The network entity records and provides notifications of events associated with the PRA to the OCS based on the PRA identifier selected by the PCRF. For example, the PGW can provide information to OCFS for generating charging data records (CDRs) including a field that specifies a PRA event involving the user equipment such as the user equipment entering or leaving the PRA indicated by the PRA identifier.

Current and upcoming releases of the 3GPP standards allow network entities (such as a PGW or SMF) to monitor the presence of user equipment in multiple PRAs concurrently. The current and upcoming releases of the 3GPP standards therefore allow the PCRF to subscribe to notifications provided by the network entity for multiple PRAs associated with a user equipment. The OCS is also permitted to subscribe to receive notifications for multiple PRAs for the user equipment. In response to a PRA event, such as the user equipment entering or leaving one of the multiple PRAs in the OCS subscription, the network entity reports the event to the OCS for online charging and the network entity (and in some cases a serving gateway, SGW) reports the event to an off-line charging system (OFCS) for generating CDR with a field indicating the PRA event. However, the PCRF and the OCS independently subscribe to different sets of PRAs, which may or may not overlap partially or completely. The network entity reports PRA events in the PCRF subscription to the PCRF. However, any events associated with pre-configured CN PRAs in the PCRF subscription that are not in the set of pre-configured core network PRAs in the OCS subscription are not reported to the OFCS. Also, any events associated with UE dedicated PRAs in the PCRF subscription are not reported to the OFCS FIGS. 1-5 disclose providing charging information for a user equipment in presence reporting areas (PRAs) associated with a policy and charging rules function (PCRF) or an online charging system (OCS) to an off-line charging system (OFCS). The PCRF subscribes towards a network entity (such as a packet data network (PDN) gateway, PGW, or service management function, SMF) to receive notifications of PRA events from the network entity for a first set of PRAs associated with a user equipment. The OCS subscribes towards the network entity to receive records of PRA events from the network entity for a second set of PRAs associated with the user equipment. The network entity provides reports to the OFCS in response to detecting events in the first set of PRAs and the second set of PRAs. Some embodiments of the PCRF or the OCS subscribe to receive the notifications of PRA events by transmitting lists of PRA identifiers to the network entity. The lists include PRA identifiers to be activated for core network preconfigured PRAs or PRA identifiers and corresponding elements (such as tracking areas, routing areas, or base stations) for user equipment dedicated PRAs. Some embodiments of the reports generated by the network entity for the first and second sets of PRAs include identifier(s) of the PRA(s) associated with an event. For each PRA, the reports include a status of the PRA such as whether the user equipment is entering or leaving the PRA or the PRA is inactive. Furthermore, for user equipment dedicated PRA, the reports include a list of elements in the PRA such as the tracking areas, routing areas, base stations, eNodeBs, or NG-RAN node identifiers that form the user equipment dedicated PRA. The network entity generates reports that include a list of PRA(s) with PRA identifier(s), PRA status(es), and for UE-dedicated PRA, the list of elements in the PRA(s). The reports are generated upon detecting an event in the first set of PRAs subscribed to by the PCRF. The OFCS uses the reports generated by the network entity towards the OFCS to generate charging data records (CDRs) for analytic purposes.

FIG. 1 is a block diagram of a communication system 100 that generates notifications in response to events in PRAs according to some embodiments. The architecture of some embodiments the communication system 100 is partially defined according to the policy and charging control reference architecture defined by 3GPP TS 23.203, "Technical Specification Group Services and System Aspects, Policy and charging control architecture," which is incorporated herein by reference in its entirety. The elements of the network charging system 100 shown in FIG. 1 therefore correspond to elements of a Fourth Generation (4G) wireless communication system. In the interest of clarity, techniques for utilizing charging policies in communication systems that implement separate control plane and user plane functionality are discussed herein in the context of a 4G wireless communication system. However, some embodiments of the network charging system 100 are defined according to other reference architectures and the techniques disclosed herein are equally applicable to other reference architectures. In particular, some embodiments of the techniques disclosed herein are applicable to other reference architectures such as a Fifth Generation (5G) reference architectures that implement a policy control function (PCF) instead of a PCRF, a service management function (SMF) instead of a PGW, and the like.

The communication system 100 includes a PCRF 105 that performs policy control decision-making and flow-based charging control. The communication system 100 also includes an online charging system (OCS) 110 that is used to charge customers, in real time, based on service usage. The OCS 110 implements events-based charging to charge events based on occurrence, session-based charging for networker user sessions, and the like. The communication system 100 also includes an off-line charging system (OFCS) 115 that gathers network resource usage information concurrently with the resource usage, e.g., by a user. The OFCS 115 generates charging data records (CDRs) based on the usage information. The CDRs are transferred to a billing function for subscriber billing or inter-operator accounting.

A packet data network (PDN) gateway (PGW) 120 provides connectivity from user equipment to external packet data networks by being a point of exit and entry for traffic associated with the user equipment. A serving gateway (SGW) 125 routes and forwards user data packets and acts as a mobility anchor for a user plane during handover is between base stations or different radio access technologies. The SGW 125 terminates downlink data paths for idle user equipment and triggers paging when downlink data arrives for the user equipment. The SGW 125 exchanges signals with the base stations 130, 135 that provide wireless connectivity within corresponding PRAs 140, 145. As used herein, the term "base station" refers to entities that provide wireless connectivity within corresponding geographic areas including eNodeBs, access points, macrocells, microcells, picocells, femtocells, and the like. As discussed herein, the PRAs 140, 145 include one or more additional base stations, cells, tracking areas, routing areas, eNodeBs, or NG-RAN node identifiers, as disclosed in 3GPP Technical Specification (TS) 23.501, § 5.6.11, "UE presence in Area of Interest reporting usage by SMF," which is incorporated herein by reference in its entirety.

A network entity such as the PGW 120 (or an SMF in a 5G system) subscribes the PCRF 105 to receive notifications of events for a first set of presence reporting areas (PRAs) associated with a PDN connection for user equipment 150, e.g. a first set that includes the PRA 140. The network entity then notifies to the PCRF 105 the "initial" status for each PRA of the first set of PRAs and notifies in parallel to the OFCS 115 (e.g., PRA 140 "out area"). The OCS 110 also subscribes with the network entity to receive notifications for a second set of PRAs associated with the same PDN connection of user equipment 150, e.g. a first set that includes the PRA 145. The network entity then notifies to the OCS 110 the "initial" status for each PRA of the second set of PRAs and notifies in parallel to OFCS 115 (e.g., PRA 145 "in area"). The network entity then notifies the OFCS 115 in response to events occurring in the PRAs (PRA 145 "in area" OCS-related). In some embodiments, the network entity notifies the OFCS 115 in response to an event occurring at PRA(s) that are in the first set of PRAs. For example, the network entity notifies the OCS 110 in parallel with notifying the PCRF 105 in response to the PRA not being in the second set of PRAs. Some embodiments of the network entity notify the PCRF 105 and the OCS 110 in response to events occurring at PRAs that are in the first set of PRAs and the second set of PRAs. For example, the PGW notifies the PCRF 105 and the OCS 110 in parallel in response to an event occurring at a PRA that is in the first and second sets of PRAs.

The SGW 125 detects events that occur in the PRAs 140, 145. Some embodiments of the SGW 125 detect an event that occurs when the user equipment 150 enters the PRA 140 that is served by the base station 130, as indicated by the arrow 155, and. the user equipment 150 leaves the PRA 145 that is served by the base station 135, as indicated by the arrow 165. The SGW 125 can also detect whether either of the PRAs 140, 145 becomes inactive for the PDN connection associated with the user equipment 150. In the illustrated embodiment, the PCRF 105 and the OCS 110 are subscribed to the PGW 120 to receive notifications of events at the PRAs 140, 145. The notifications include charging information that is used to determine amounts to charge users of the user equipment 150, for analytical purposes, and the like. The SGW 125 provides information to the PGW 120 indicating the events 155, 165 in response to the user equipment 150 entering the PRA 140 and the user equipment 150 leaving the PRA 145, respectively and a PRA becoming active The notifications are selectively provided to the PCRF 105 and the OCS 110, depending on the corresponding subscriptions to the PGW 120. The notifications are provided to the OFCS 115 for both cases. In the illustrated embodiment, the PCRF 105 subscribes to notifications for the UE-dedicated PRA 140 and the preconfigured CN PRA 145, e.g., by transmitting identifiers of the PRAs 140, 145 to the PGW 120. The subscription request for the UE-dedicated PRA 140 also includes a list of corresponding elements in the UE-dedicated PRA 140. The OCS 110 subscribes to notifications for only the preconfigured CN PRA 145, e.g., by transmitting the identifier of the PRA 145 to the PGW 120. The identifiers are included in lists of PRA identifiers to be activated for core network preconfigured PRAs. The identifiers are included in lists of PRA identifiers and corresponding elements (such as tracking areas, routing areas, or base stations) for user equipment dedicated PRAs. The PGW 120 notifies PCRF 105 and the OFCS 115 (in parallel) in response to events occurring in the UE-dedicated PRA 140. The PGW 120 notifies the PCRF 105, the OCS 110, and the OFCS 115 (in parallel) in response to events occurring in the preconfigured CN PRA 145 for both PCRF and OCS subscriptions. Some embodiments of the notification generated by the PGW 120 include an identifier of the PRA 140, 145 associated with an event. The notification also includes a status of the PRA 140, 145 such as whether the user equipment 150 is entering or leaving the PRA 140, 145, or if the PRA 140, 145 is inactive. For a user equipment dedicated PRA, the notification includes the list of elements in the PRA such as the tracking areas, routing areas, base stations, eNodeBs, or NG-RAN node identifiers that form the user equipment dedicated PRA. The OFCS 115 uses the reports generated by the PGW 120 to generate one or more charging data records (CDR) 170 for analytic purposes.

Figure 2:
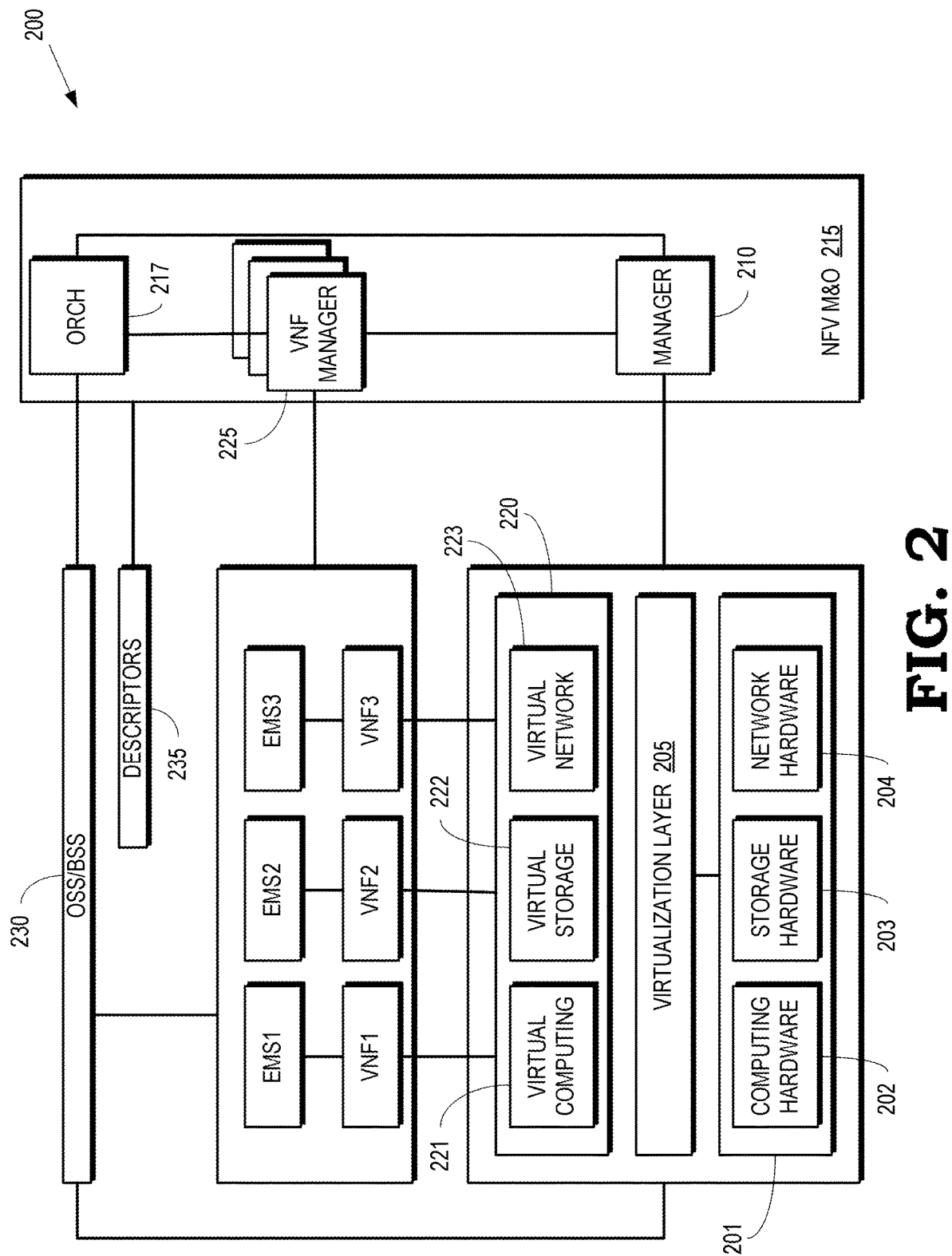
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing resources 221, virtual storage resources 222, and virtual networking resources 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices that provide user plane or control plane functions. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
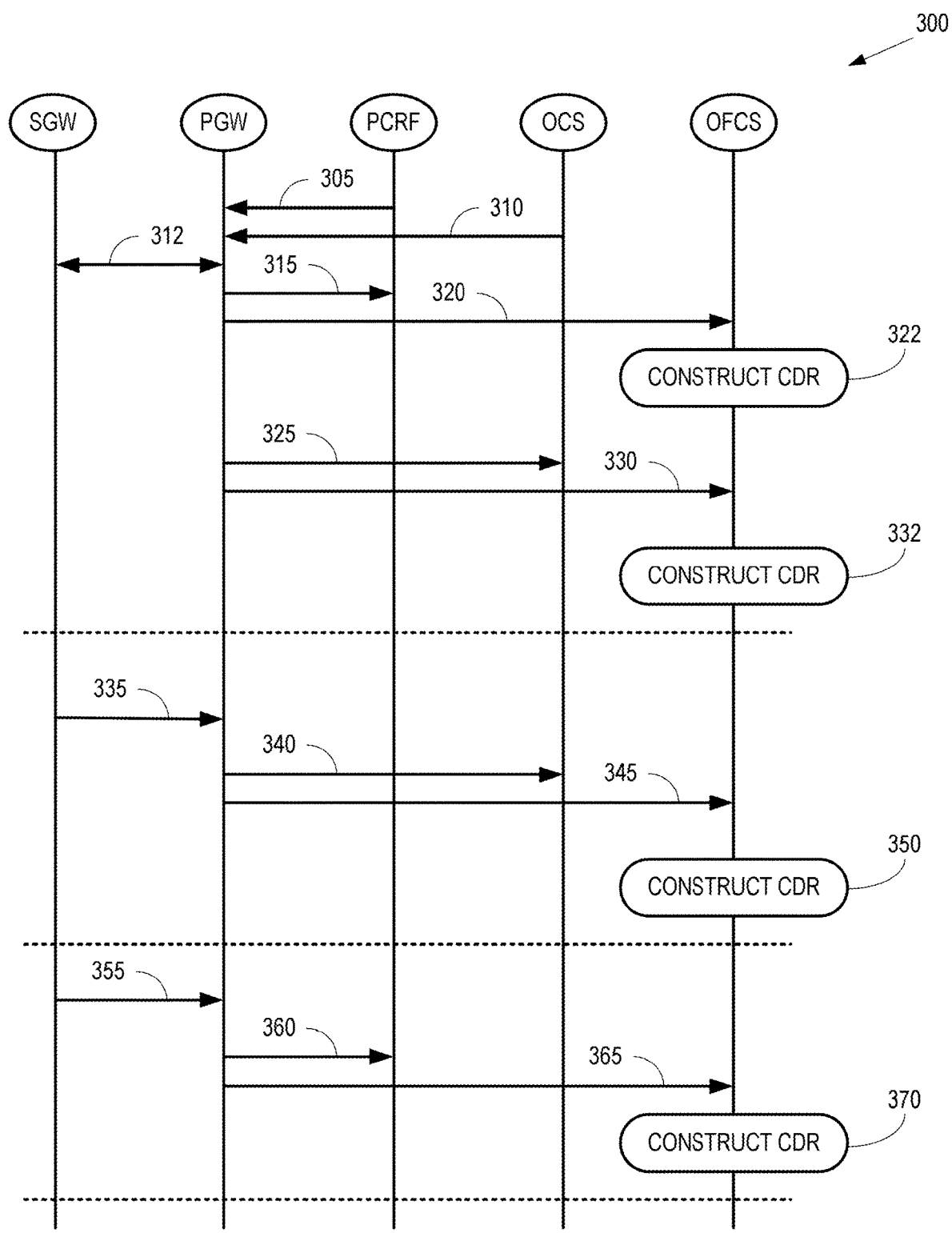
FIG. 3 illustrates a first example of a message flow that is used to selectively provide notifications of PRA events to a policy and charging rules function (PCRF), an online charging system (OCS), and an off-line charging system (OFCS) according to some embodiments.

FIG. 3 illustrates a first example of a message flow 300 that is used to selectively provide notifications of PRA events to a PCRF, an OCS, and an OFCS according to some embodiments. The message flow 300 is implemented in some embodiments of the communication system 100 shown in FIG. 1.

The PCRF provides a subscription request 305 towards the PGW to request notification of PRA events for a first set of PRAs for a PDN connection associated with the user equipment. In the illustrated embodiment, the subscription request 305 includes a list of identifiers of the first set of PRAs, e.g., PRA id1, PRA id2, PRA id3 (which also includes a list of tracking areas that are associated with PRA id3). The PRA id1 and PRA id 2 identify core network PRAs and PRA id3 is a user equipment-dedicated PRA.

The OCS provides a subscription request 310 towards the PGW to request notification of PRA events for a second set of PRAs for the PDN connection associated with user equipment. In the illustrated embodiment, the subscription request 310 includes a list of identifiers of the second set of PRAs, e.g., PRA id2, PRA id4 (which also includes a list of tracking areas that are associated with PRA id4), and PRA id5. The PRA id5 and PRA id2 (which is the same as PRA id2 of the first set of PRAs) are core network PRAs and PRA id4 is a user equipment-dedicated PRA. Thus, only the PCRF is subscribed to PRA id1 and PRA id3, only the OCS is subscribed to PRA id4 and PRA id5, and both the PCRF and the OCS are subscribed to PRA id2.

In response to registration of the PCRF and the OCS, the PGW interacts (as indicated by the double-headed arrow 312) with the SGW (or an MME) to retrieve the initial status toward the MME. The PGW then provides corresponding initial statuses to the PCRF. The PGW provides an initial status 315 for the PRAs in the first set to the PCRF. The initial status 315 indicates whether the PRAs are "in area," "out area," or "inactive." The PGW also sends a notification 320 to the OFCS. At block 322, the OFCS constructs a CDR based on the information received from the PGW. The notification 320 include a list of the PRAs in the first set, the statuses of the PRAs in the first set, and an indication that the list is PCRF-related. The PGW provides an initial status 325 for the PRAs in the second set to the OCS. The initial status 325 indicates whether the PRAs are "in area," "out area," or "inactive." The PGW also sends a notification 330 to the OFCS. The notification 330 include a list of the PRAs in the first set, the statuses of the PRAs in the first set, and an indication that the list is OCS-related. At block 332, the OFCS constructs a CDR based on the information received from the PGW.

If the SGW (or the MME) detects the user equipment entering PRA id5, the SGW sends a notification 335 to the PGW. The notification 335 includes a status that indicates that "UE is entering PRA id5." In response to receiving the notification 335, the PGW transmits a notification 340 to the OCS that also includes the status that indicates that "UE is entering PRA id5." The PGW also transmits an event 345 (which is also referred to as charging information) to the OFCS that includes an indication that the event 335 occurred at a PRA that is associated with the OCS the identifier PRA id5 and the status "in area" to indicate that the user equipment is entering the PRA id5. The event 345 is transmitted in parallel with the notification 340. In response to receiving the event 345, the OFCS constructs (at block 350) a CDR based on the received information. The OFCS either generates a new CDR to include the received information or captures the received information in an existing CDR.

If the SGW (or an MME) detects the user equipment entering PRA id1, the SGW sends a notification 355 to the PGW. The notification 355 includes a status that indicates that "UE is entering PRA id1." In response to receiving the notification 355, the PGW transmits a notification 360 to the PCRF that also includes the status that indicates that "UE is entering PRA id1." The PGW also transmits an event 365 (which is also referred to as charging information) to the OFCS that includes an indication that the event 365 occurred at a PRA that is associated with the PCRF, the identifier PRA id1, and the status "entering" to indicate that the user equipment is entering the PRA id1. The event 365 is transmitted in parallel with the notification 360. In response to receiving the event 365, the OFCS constructs (at block 370) a CDR based on the received information. The OFCS either generates a new CDR to include the received information or captures the received information in an existing CDR.

Figure 4:
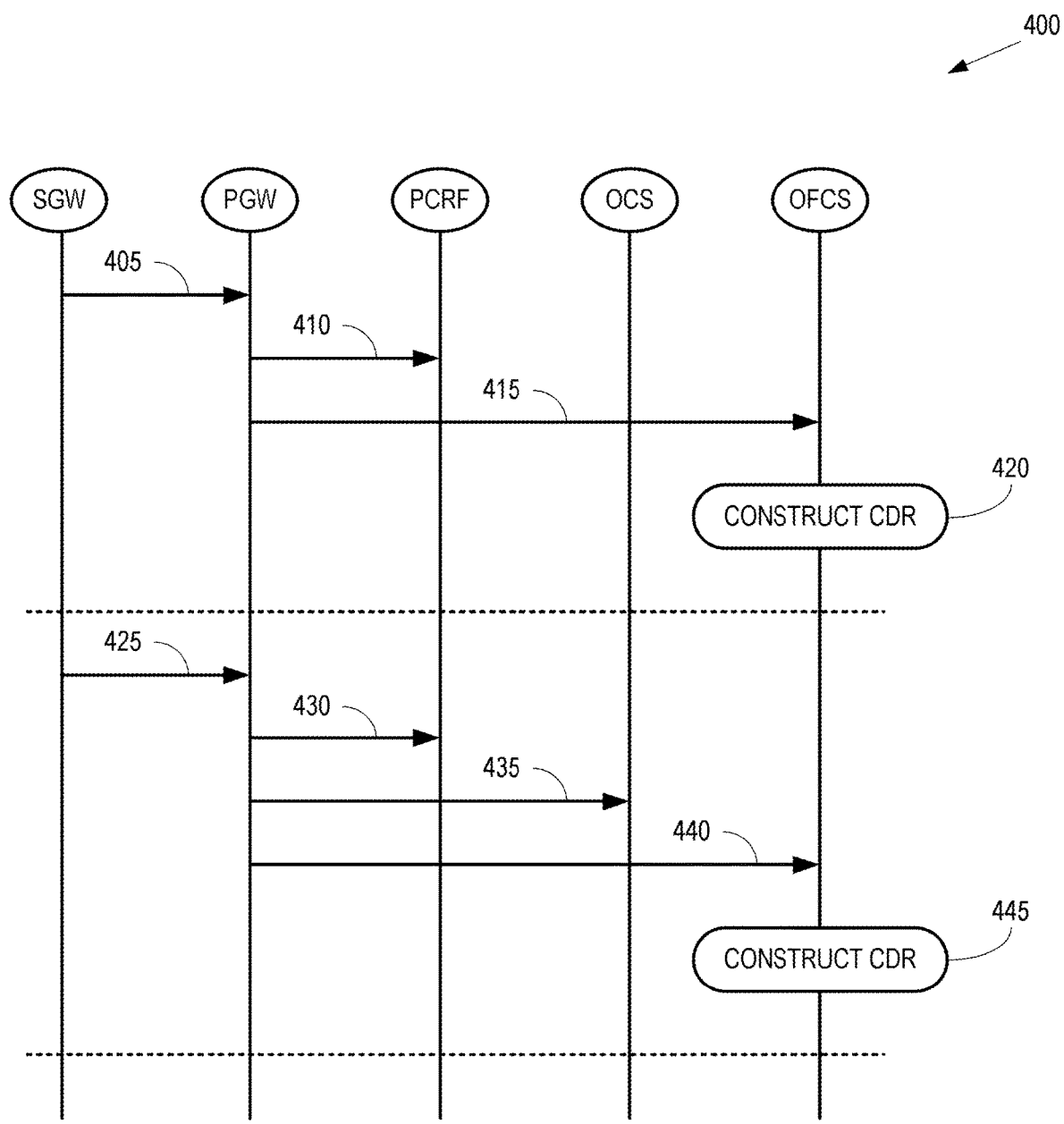
FIG. 4 illustrates a second example of a message flow that is used to selectively provide notifications of PRA events to a PCRF, an OCS, and an OFCS according to some embodiments.

FIG. 4 illustrates a second example of a message flow 400 that is used to selectively provide notifications of PRA events to a PCRF, an OCS, and an OFCS according to some embodiments. The message flow 400 is implemented in some embodiments of the communication system 100 shown in FIG. 1. In the illustrated embodiment, the PCRF and the OCS are subscribed to receive notifications from the PGW, e.g., as discussed herein with regard to FIG. 3.

If the SGW (or an MME) detects the user equipment entering PRA id3, the SGW sends a notification 405 to the PGW. The notification 405 includes a status that indicates that "UE is entering PRA id3." In response to receiving the notification 405, the PGW transmits a notification 410 to the PCRF that also includes the status that indicates that "UE is entering PRA id3." The PGW also transmits an event 415 (which is also referred to as charging information) to the OFCS that includes an indication that the event 415 occurred at a PRA associated with the PCRF, the identifier PRA id3, and the status "entering" to indicate that the user equipment is entering the PRA id3 and also includes the list of tracking areas that are associated with PRA id3. The event 415 is transmitted in parallel with the notification 410. In response to receiving the event 415, the OFCS constructs (at block 420) a CDR based on the received information. The OFCS either generates a new CDR to include the received information or captures the received information in an existing CDR.

If the SGW (or an MME) detects the user equipment entering PRA id2, which is included in the first set of PRAs subscribed to by the PCRF and the second set of PRAs subscribed to by the OCS, the SGW sends a notification 425 to the PGW.

The notification 425 includes a status that indicates that "UE is entering PRA id2." In response to receiving the notification 425, the PGW transmits a notification 430 to the PCRF and a notification 435 to the OCS in parallel with the notification 430. The notifications 430, 435 include the status that indicates that "UE is entering PRA id2." The PGW also transmits an event 440 (which is also referred to as charging information) to the OFCS that includes an indication that the event 440 occurred at a PRA associated with the PCRF and OCS, the identifier PRA id2, and the status "entering" to indicate that the user equipment is entering the PRA id2. The event 440 is transmitted in parallel with the notifications 430, 435. In response to receiving the event 440, the OFCS constructs (at block 445) a CDR based on the received information. The OFCS either generates a new CDR to include the received information or captures the received information in an existing CDR.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  a) hardware-only circuit implementations (such as implementations and only analog and/or digital circuitry) and
  b) combinations of hardware circuits and software, such as (as applicable):
    (i) a combination of analog and/or digital hardware circuit(s) with software/firmware and
    (ii) any portions of a hardware processor(s) with software (including digital signal processor(s), software, and memory(ies) that work together to cause an apparatus, such as a mobile phone or server, to perform various functions) and
  c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   subscribing, at a network entity, a policy control and resource function (PCRF) to receive notifications of events for a first set of presence reporting areas (PRAs) associated with a packet data network (PDN) connection involving a user equipment;
   subscribing, at the network entity, an online charging system (OCS) to receive notifications of events for a second set of PRAs associated with the PDN connection involving the user equipment;
   notifying, from the network entity, an off-line charging system (OFCS) of a first event in response to the first event occurring in at least one first PRA that is in the first set of PRAs;
   receiving, at the network entity, information indicating initial statuses for the PRAs in the first set of PRAs;
   notifying, from the network entity, the PCRF of the initial statuses for the PRAs in the first set of PRAs;
   notifying, from the network entity, the OFCS of the initial statuses for the PRAs in the first set of PRAs with an indication that the PRAs in the first set of PRAs are PCRF-related;
   receiving, at the network entity, information indicating initial statuses for the PRAs in the second set of PRAs;
   notifying, from the network entity, the OCS of the initial statuses for the PRAs in the second set of PRAs; and
   notifying, from the network entity, the OFCS of the initial statuses for the PRAs in the second set of PRAs with an indication that the PRAs in the second set of PRAs are OCS-related.

2. The method of claim 1, wherein the network entity comprises at least one of a PDN gateway (PGW) and a service management function (SMF).

3. The method of claim 1, wherein the first event is at least one of the user equipment entering the at least one first PRA and the user equipment leaving the at least one first PRA, and the at least one PRA becoming inactive.

4. The method of claim 1, wherein the at least one first PRA is at least one of a user equipment dedicated PRA and a core network PRA.

5. The method of claim 1, wherein the at least one first PRA is not in the second set of PRAs, and wherein notifying the OFCS in response to the first event comprises notifying the OCS in parallel with notifying the PCRF.

6. An apparatus comprising:
   a receiver configured to receive a request to subscribe a policy control and resource function (PCRF) to receive notifications of events for a first set of presence reporting areas (PRAs) associated with a packet data network (PDN) connection involving a user equipment, wherein the receiver is configured to receive a request to subscribe an online charging system (OCS) to receive notifications of events for a second set of PRAs associated with the PDN connection involving the user equipment; and
   a transmitter configured to transmit a notification of a first event to an off-line charging system (OFCS) in response to the first event occurring in at least one first PRA that is in the first set of PRAs;
   wherein the receiver is configured to receive information indicating initial statuses for the PRAs in the first set of PRAs, and the transmitter is configured to notify the PCRF of the initial statuses for the PRAs in the first set of PRAs and notify the OFCS of the initial statuses for the PRAs in the first set of PRAs with an indication that the PRAs in the first set of PRAs are PCRF-related;
   wherein the receiver is configured to receive information indicating initial statuses for the PRAs in the second set of PRAs, and the transmitter is configured to notify the OCS of the initial statuses for the PRAs in the second set of PRAs and notify the OFCS of the initial statuses for the PRAs in the second set of PRAs with an indication that the PRAs in the second set of PRAs are OCS-related.

7. The apparatus of claim 6, wherein the apparatus is implemented in at least one of a PDN gateway (PGW) and a service management function (SMF).

8. The apparatus of claim 6, wherein the first event is at least one of the user equipment entering the first at least one PRA, the user equipment leaving the at least one first PRA, and the at least one PRA becoming inactive.

9. The apparatus of claim 6, wherein the at least one first PRA is at least one of a user equipment dedicated PRA and a core network PRA.

10. The apparatus of claim 6, wherein the at least one first PRA is not in the second set of PRAs, and wherein notifying the OFCS in response to the first event comprises notifying the OCS in parallel with notifying the PCRF.

11. The apparatus of claim 6, wherein the transmitter is configured to notify the PCRF and the OCS in response to a second event occurring in at least one second PRA that is in the first set of PRAs and the second set of PRAs.

12. The apparatus of claim 11, wherein the transmitter is configured to notify the OFCS in parallel with notifying the PCRF and the OCS.

13. The apparatus of claim 6, wherein the OFCS generates a charging data record based on the notification of the first event.

14. An apparatus comprising:
   at least one processor; and
   at least one memory including computer program code;
   the at least one memory and the computer program code configured to, with the at least one processor, cause the apparatus at least to perform:
      subscribing a policy control and resource function (PCRF) to receive notifications of events for a first set of presence reporting areas (PRAs) associated with a packet data network (PDN) connection involving a user equipment;

subscribing an online charging system (OCS) to receive notifications of events for a second set of PRAs associated with the PDN connection involving the user equipment;

notifying an off-line charging system (OFCS) in response to a first event occurring in at least one first PRA that is in the first set of PRAs;

receiving, at the network entity, information indicating initial statuses for the PRAs in the first set;

notifying, from the network entity, the PCRF of the initial statuses for the PRAs in the first set;

notifying, from the network entity, the OFCS of the initial statuses for the PRAs in the first set with an indication that the PRAs in the first set are PCRF-related;

receiving, at the network entity, information indicating initial statuses for the PRAs in the second set;

notifying, from the network entity, the OCS of the initial statuses for the PRAs in the second set; and notifying, from the network entity, the OFCS of the initial statuses for the PRAs in the second set with an indication that the PRAs in the second set are OCS-related.

15. The apparatus of claim 14, wherein the at least one memory and the computer program code are configured to, with the at least one processor, cause the apparatus to:

notify the OCS in parallel with notifying the PCRF in response to the at least one first PRA not being in the second set of PRAs.

* * * * *